US012755458B2

(12) United States Patent
Kalish

(10) Patent No.: US 12,755,458 B2
(45) Date of Patent: Oct. 6, 2026

(54) SYSTEM AND METHOD TO MAINTAINING GENERATED AI VIDEO

(71) Applicant: Idomoo LTD, Raanana (IL)

(72) Inventor: Danny Kalish, Raanana (IL)

(73) Assignee: Idomoo LTD, Raanana (IL)

( * ) Notice: Subject to any disclaimer, the term of this patent is extended or adjusted under 35 U.S.C. 154(b) by 89 days.

(21) Appl. No.: 18/933,817

(22) Filed: Oct. 31, 2024

(65) Prior Publication Data

US 2025/0139861 A1 May 1, 2025

Related U.S. Application Data

(60) Provisional application No. 63/594,507, filed on Oct. 31, 2023.

(51) Int. Cl.

| | |
|---|---|
| ***G06T 11/60*** | (2026.01) |
| ***G06N 20/00*** | (2019.01) |
| ***G06T 13/00*** | (2011.01) |

(52) U.S. Cl.

CPC .............. *G06T 11/60* (2013.01); *G06N 20/00* (2019.01); *G06T 13/00* (2013.01); *G06T 2200/24* (2013.01)

(58) Field of Classification Search

CPC ................................ G06T 11/60; G06N 20/00

See application file for complete search history.

(56) References Cited

U.S. PATENT DOCUMENTS 11,893,433 B1 * 2/2024 Kanefield ........ G06K 19/06037

* cited by examiner

*Primary Examiner* — Matthew Salvucci

(74) *Attorney, Agent, or Firm* — FisherBroyles, LLP; Roger L. Browdy

(57) ABSTRACT

The present invention disclose: A method for maintaining generated Ai video, said method comprising the steps of:

Receiving text message of user describing the requested video;

Applying generative AI model for generating detailed instruction to generate the video Wherein the video is comprised of scenes, each scene has motion layout format including definitions of type of objects appearing, layout of objects, order of displaying objects Generating video based on detailed instruction to generate the video One user approve video saving detailed instruction to generate the video instead of the video enabling to generate the video ant any time.

21 Claims, 10 Drawing Sheets

SYSTEM AND METHOD TO MAINTAINING GENERATED AI VIDEO

BACKGROUND

Technical Field

The present invention relates generally to maintaining generated Ai video.

SUMMARY

The present provides of a method for maintaining generated Ai video, said method comprising the steps of:

Receiving text message of user describing the requested video;

Applying generative AI model for generating promotion/marketing concept or educational, informative, entrainment;

Applying generative AI model for determining video style, wherein the style include emotion type, design format, length, limited by Personal style; Design limitation Brand guidance Applying generative AI model for creating text script, each layout structure of video scene is designed to match promotional concept, video style;

Applying generative AI model for creating text script based on the generated marketing concept, style and format for video using the text messages, wherein the script is comprised of scenes, each scene is designed to match layout structure of video scenes Wherein the video is comprised of scenes, each scene has motion layout format including definitions of type of objects appearing, layout of objects, order of displaying objects Generating video based on created text script, determined video layout and style, The present invention provides a method for maintaining generated Ai video, said method comprising the steps of:

Receiving text message of user describing the requested video;

Applying generative AI model for generating detailed instruction to generate the video Wherein the video is comprised of scenes, each scene has motion layout format including definitions of type of objects appearing, layout of objects, order of displaying objects Generating video based on detailed instruction to generate the video One user approve video saving detailed instruction to generate the video instead of the video enabling to generate the video ant any time The present invention provides a method for maintaining and regenerating AI-generated videos, the method comprising the following steps:

1. Receiving User Input: Accepting a textual message or voice instruction from a user, wherein said message describes the desired content and characteristics of the requested video.
2. Processing with Generative AI Model: Utilizing a generative artificial intelligence model to interpret the user's textual message and subsequently
3. generating a comprehensive set of instructions detailing how the video should be created.
   a. Video Composition: The video is structured into multiple scenes.

b. Scene Composition: Each scene within the video adheres to a motion layout format. This format includes:—Object Definitions: Clear specifications regarding the types of objects that should appear in the scene.—Object Layout: Precise instructions on the spatial arrangement and positioning of the objects within the scene.—Display Sequence: A sequential order detailing the manner and timing in which the objects should be displayed or introduced within the scene.
4. Video Generation: Producing the video in accordance with the comprehensive set of instructions derived from the generative AI model.
5. User Approval and Storage: Upon receiving approval from the user regarding the generated video:
   Instead of storing the entire video file, the system saves the comprehensive set of instructions used to create the video.
   This approach ensures that the video can be regenerated at any given time using the stored instructions, thereby optimizing storage efficiency and allowing for on-demand video generation.

The present invention provides A method for generating a video, implemented by one or more processors operatively coupled to a non-transitory computer readable storage device, on which are stored modules of instruction code that when executed cause the one or more processors to perform said method comprising the steps of:

receiving user instruction describing the requested video;

applying generative AI model for generating promotion/marketing concept based on user instruction;

applying generative AI model for determining video style based on user instruction and/or generated promotion/marketing concept, wherein the style include at least one of: emotion type, design format;

applying generative AI model for creating text script based on the generated marketing concept and/or user instructions and/or style, wherein the script is comprised of scenes, each scene is designed to match layout structure of video scenes;

applying generative AI model for creating video layout for each scenario part based on define script part and/or user instruction, wherein each layout structure of video scene is designed to match promotional concept or video style;

wherein the video is comprised of scenes, each scene has layout format including definitions of type of objects motion or appearing, layout of objects and order of displaying objects;

generating video based on created text script, determined video layout and style.

According to some embodiments of the present invention the promotion/marketing concept include at least one of educational, informative or entrainment.

According to some embodiments of the present invention the video style is limited by personal style or design limitation brand guidance.

According to some embodiments of the present invention the method further comprising the step of applying generative AI model for determining idea concept for a story board, wherein the generation of the script is further based on the story board.

According to some embodiments of the present invention the defining scenario parts/scene is based on created determined script.

According to some embodiments of the present invention the Ai video model is generated by applying the followings steps: receive user instruction, receiving generated video options, receiving user selections of video parts sequence, user editing actions, and training AI model for learning user preferences in relation to the user text of based on user text, selected video and user editing actions.

According to some embodiments of the present invention the user interface is configured to receive user instruction, editing previous instruction, selecting manually more relevant media or use services to generate media, uploading media or text User, deleting scenes, update the script, Optionally the user approving final version, enabling manual editing option and user final selection of video segment.

According to some embodiments of the present invention the method further comprising the step of creating, training designated AI model configured to, creating promotion/marketing concept/idea, by learning user preferences in relation to the user received instruction based on user text, selected video and user actions.

According to some embodiments of the present invention the method further comprising the step of creating, training designated AI model configured to generate video, by learning user preferences in relation to the user received instruction based on user text, selected video and user actions.

According to some embodiments of the present invention the method further comprising the step of creating, training designated AI model configured to generating scripts by learning user preferences in relation to the user received instruction based on user text, selected video and user actions.

According to some embodiments of the present invention the method further comprising the step of designing video layout, creating concept, by learning user preferences in relation to the user received instruction based on user text, selected video and user actions.

According to some embodiments of the present invention the method further comprising the step of creating, training designated AI model configured to designing video layout, by learning user preferences in relation to the user received instruction based on user text, selected video and user actions.

According to some embodiments of the present invention the method further comprising the step of creating, training designated AI model configured to generating scripts by learning user preferences in relation to the user received instruction based on user text, selected video and user actions.

According to some embodiments of the present invention the method further comprising the step of creating, training designated AI model configured to, creating promotion/marketing concept/idea, by learning user preferences in relation to the user received instruction based on user text, selected video and user actions.

According to some embodiments of the present invention the method further comprising the step of creating, training designated AI model configured to define/determine video style, by learning user preferences in relation to the user received instruction based on user text, selected video and user actions According to some embodiments of the present invention the method further comprising the step of creating, training designated AI model configured to select, determine generate content by learning user preferences in relation to the user received instruction based on user text, selected video and user actions The present invention provides a system for generating a video, implemented by one or more processors operatively coupled to a non-transitory computer readable storage device, on which are stored modules processors to perform the steps of:

user interfaces module configured to receive user instruction describing the requested video;

video generation server configured for:

applying generative AI model for generating promotion/marketing concept based on user instruction;

applying generative AI model for determining video style based on user instruction and/or generated promotion/marketing concept, wherein the style include at least one of: emotion type, design format;

applying generative AI model for creating text script based on the generated marketing concept and/or user instructions and/or style, wherein the script is comprised of scenes, each scene is designed to match layout structure of video scenes;

applying generative AI model for creating video layout for each scenario part based on define script part and/or user instruction, wherein each layout structure of video scene is designed to match promotional concept or video style;

wherein the video is comprised of scenes, each scene has layout format including definitions of type of objects motion or appearing, layout of objects and order of displaying objects generating video based on created text script, determined video layout and style.

According to some embodiments of the present invention the Ai video model is generated by applying the followings steps: receive user instruction, receiving generated video options, receiving user selections of video parts sequence, user editing actions, and training AI model for learning user preferences in relation to the user text of based on user text, selected video and user editing actions.

According to some embodiments of the present invention the method the video generation server is further configured to creating, training designated AI model configured to, creating promotion/marketing concept/idea, by learning user preferences in relation to the user received instruction based on user text, selected video and user actions.

According to some embodiments of the present invention the method the video generation server is further configured to creating, training designated AI model configured to generate video, by learning user preferences in relation to the user received instruction based on user text, selected video and user actions.

According to some embodiments of the present invention the method the video generation server is further configured to creating, training designated AI model configured to generating scripts by learning user preferences in relation to the user received instruction based on user text, selected video and user actions.

BRIEF DESCRIPTION OF THE SCHEMATICS

The present invention will be more readily understood from the detailed description of embodiments thereof made in conjunction with the accompanying drawings of which:

Figure 4:
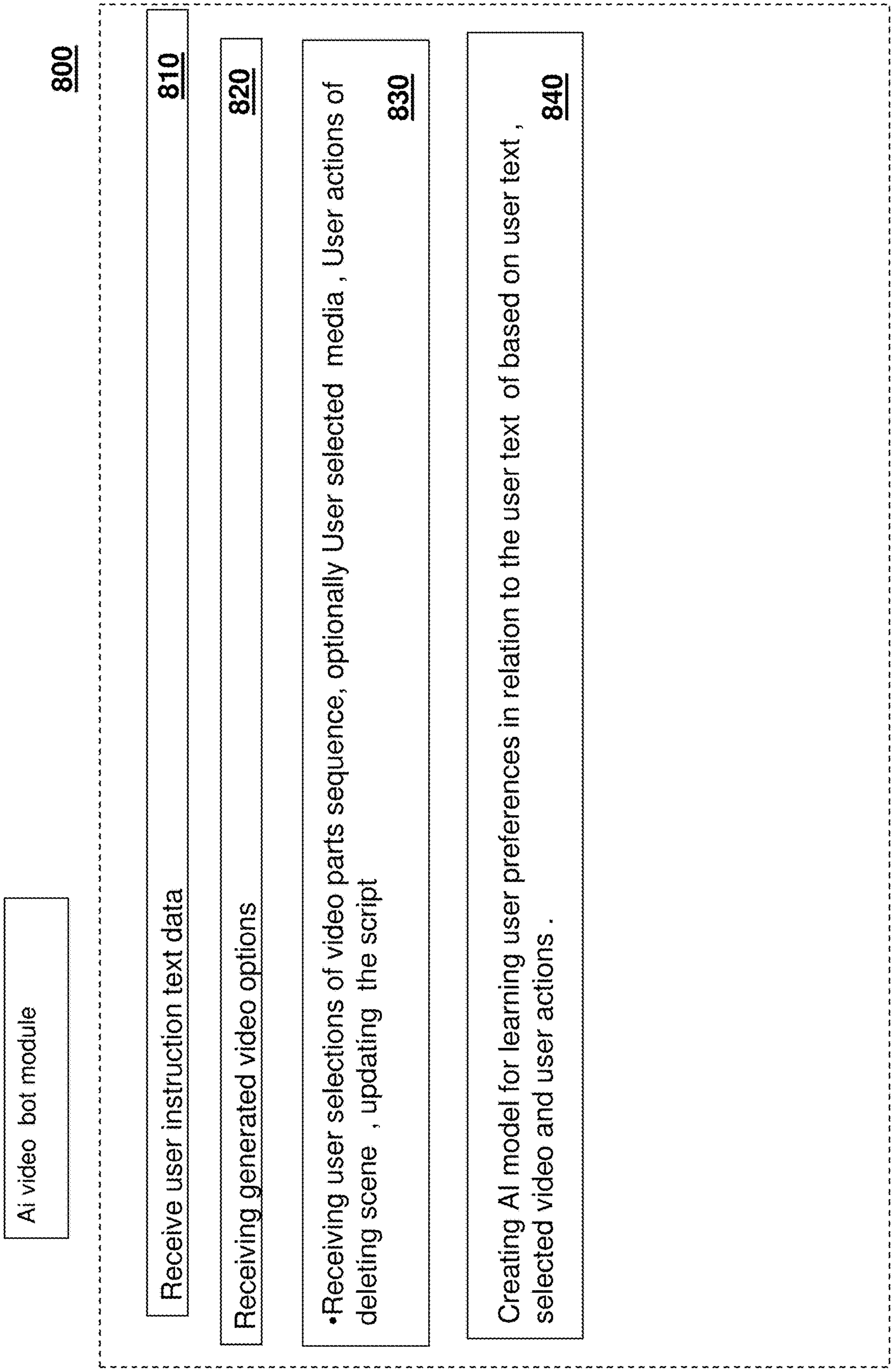

FIG. 4 presents a flowchart of the Ai video module, according to some embodiments of the invention.

Figure 5:
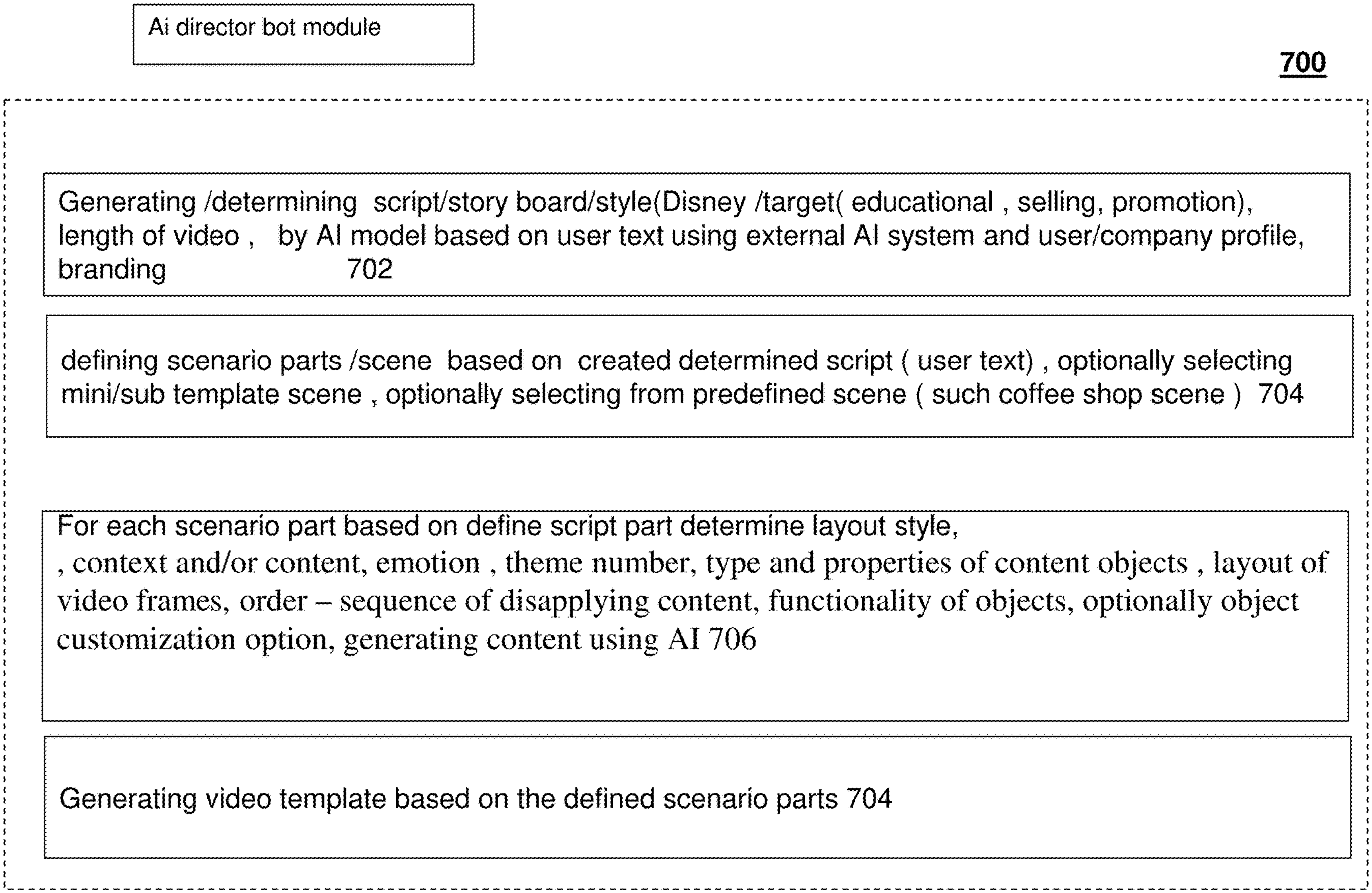

FIG. 5 presents a flowchart of the Ai director bot module, according to some embodiments of the invention.

Figure 6A:
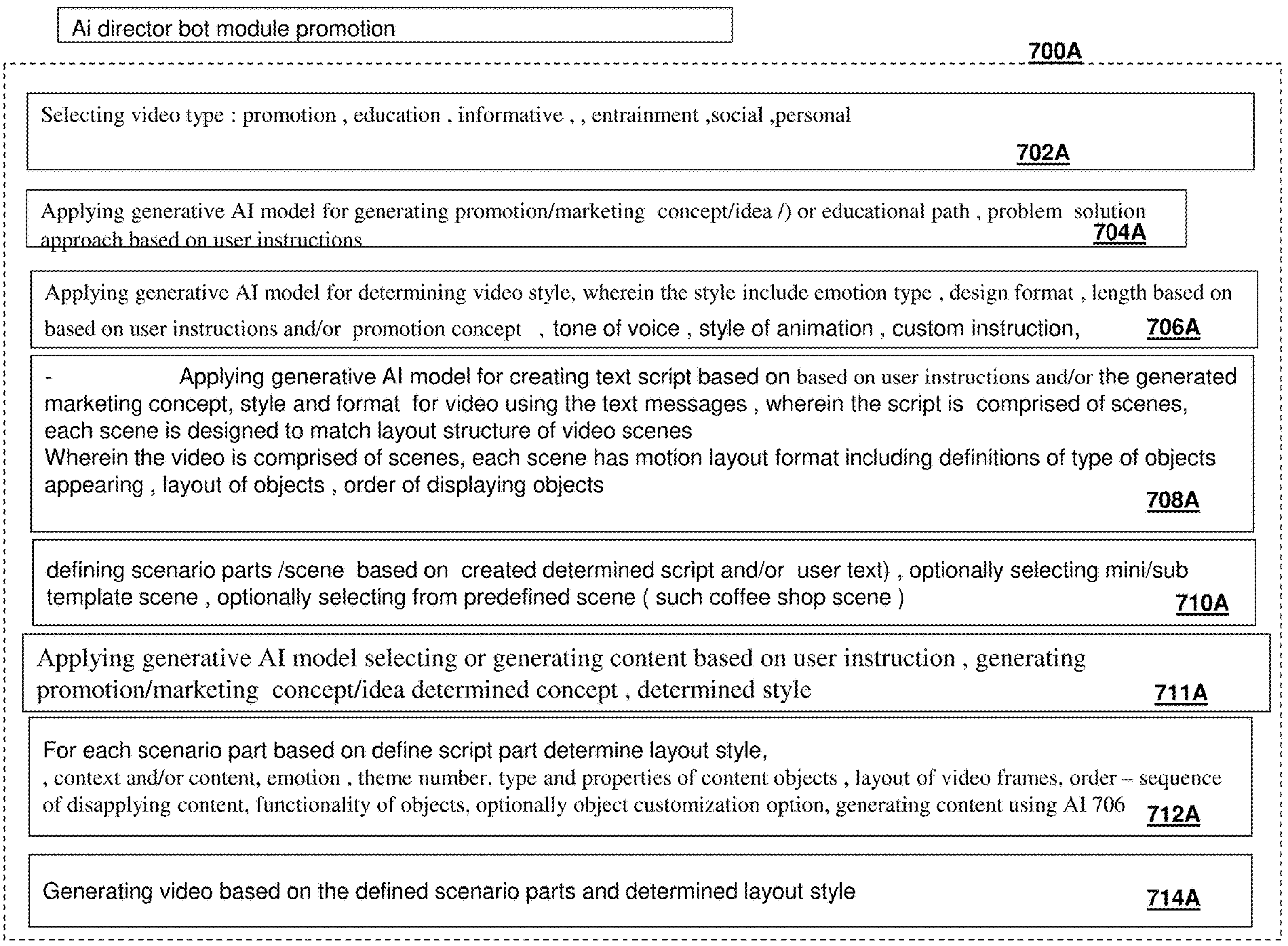

FIG. 6A presents a flowchart of the Ai director bot module, according to some embodiments of the invention.

Figure 6B:
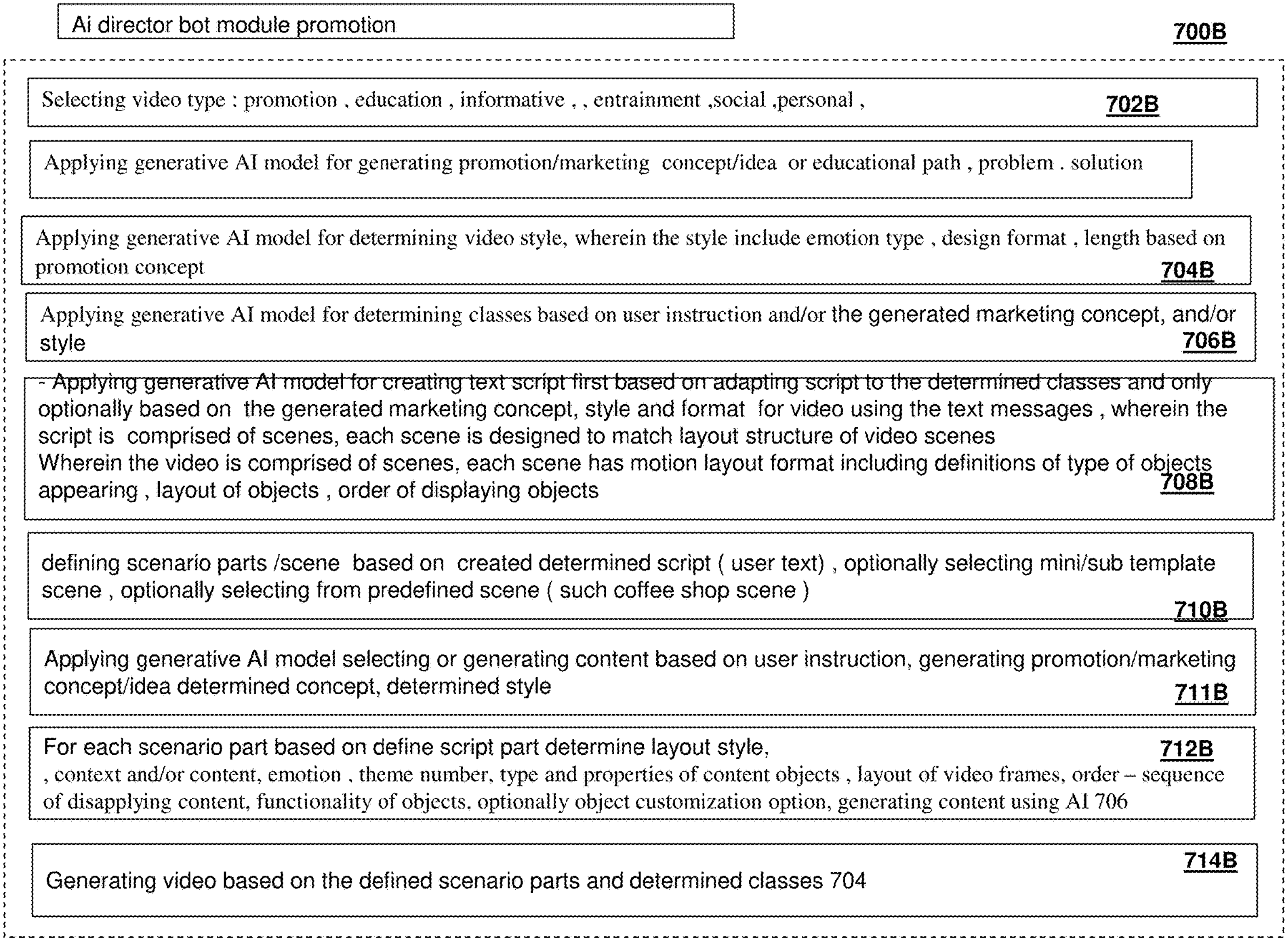

FIG. 6B presents a flowchart of the Ai director bot module, according to some embodiments of the invention.

Figure 7:
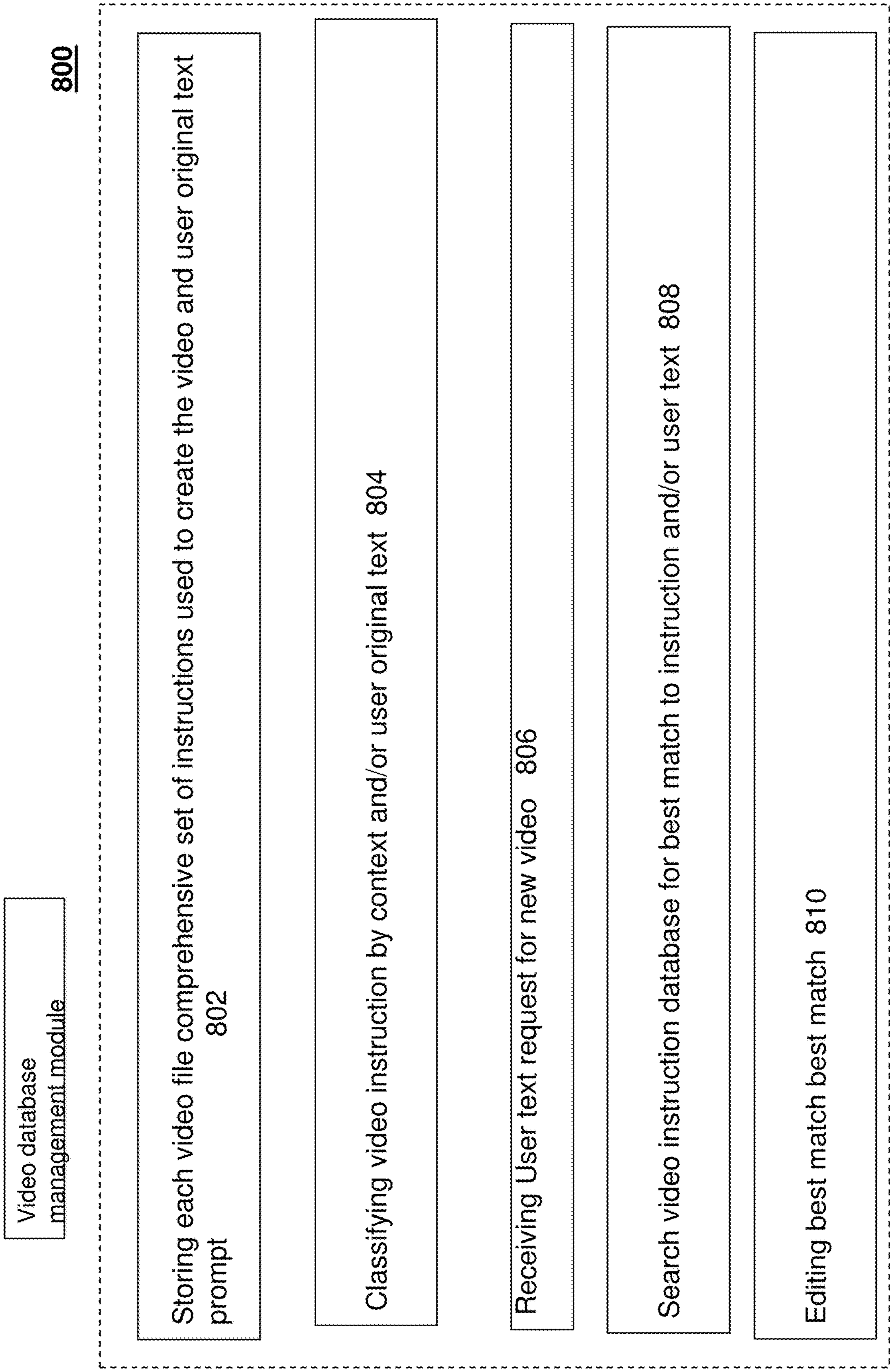

FIG. 7 presents a flowchart of the Video database management module, according to some embodiments of the invention.

Figure 8:
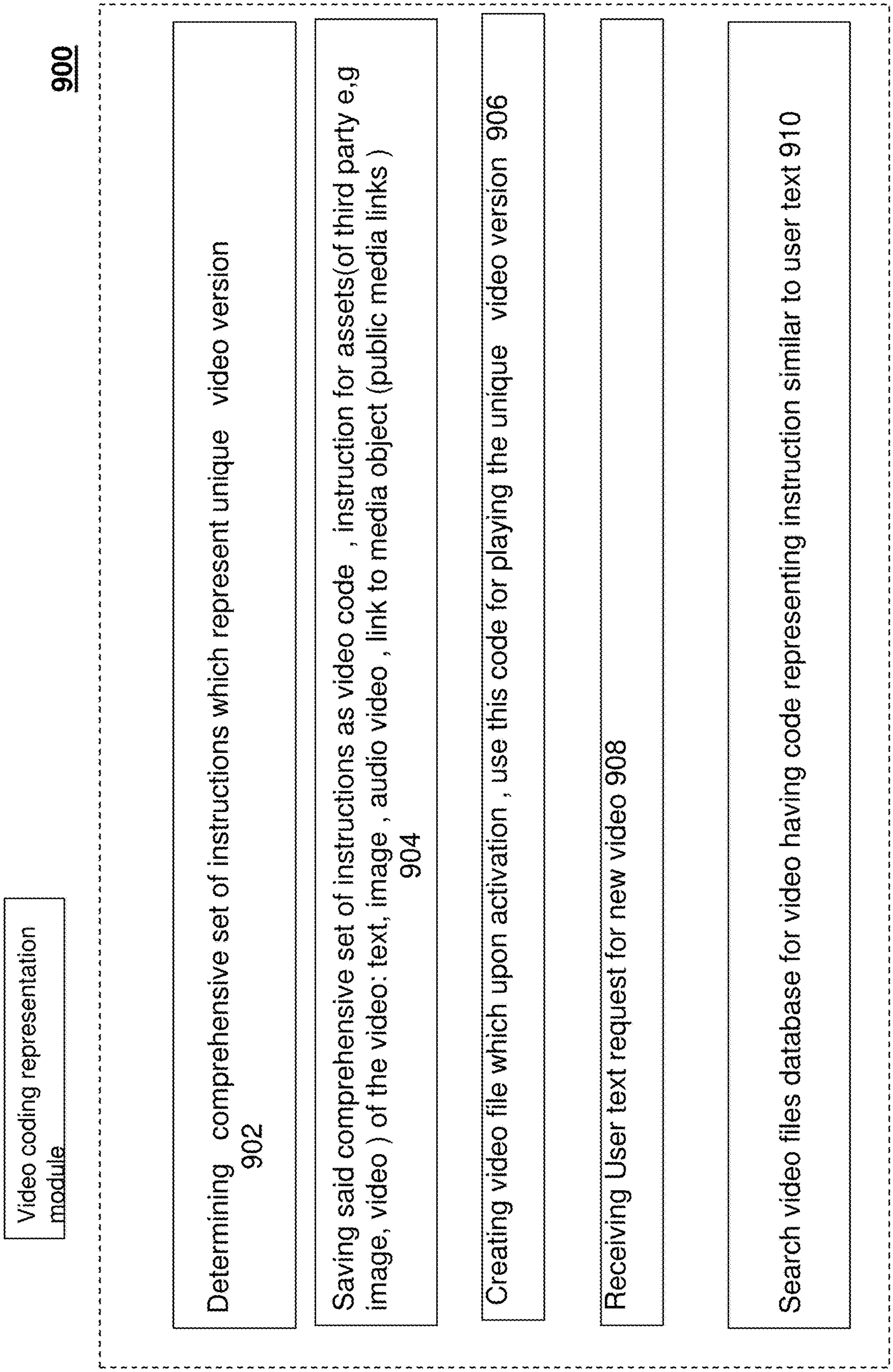

FIG. 8 presents a flowchart of the Video coding representation module, according to some embodiments of the invention.

Figure 9:
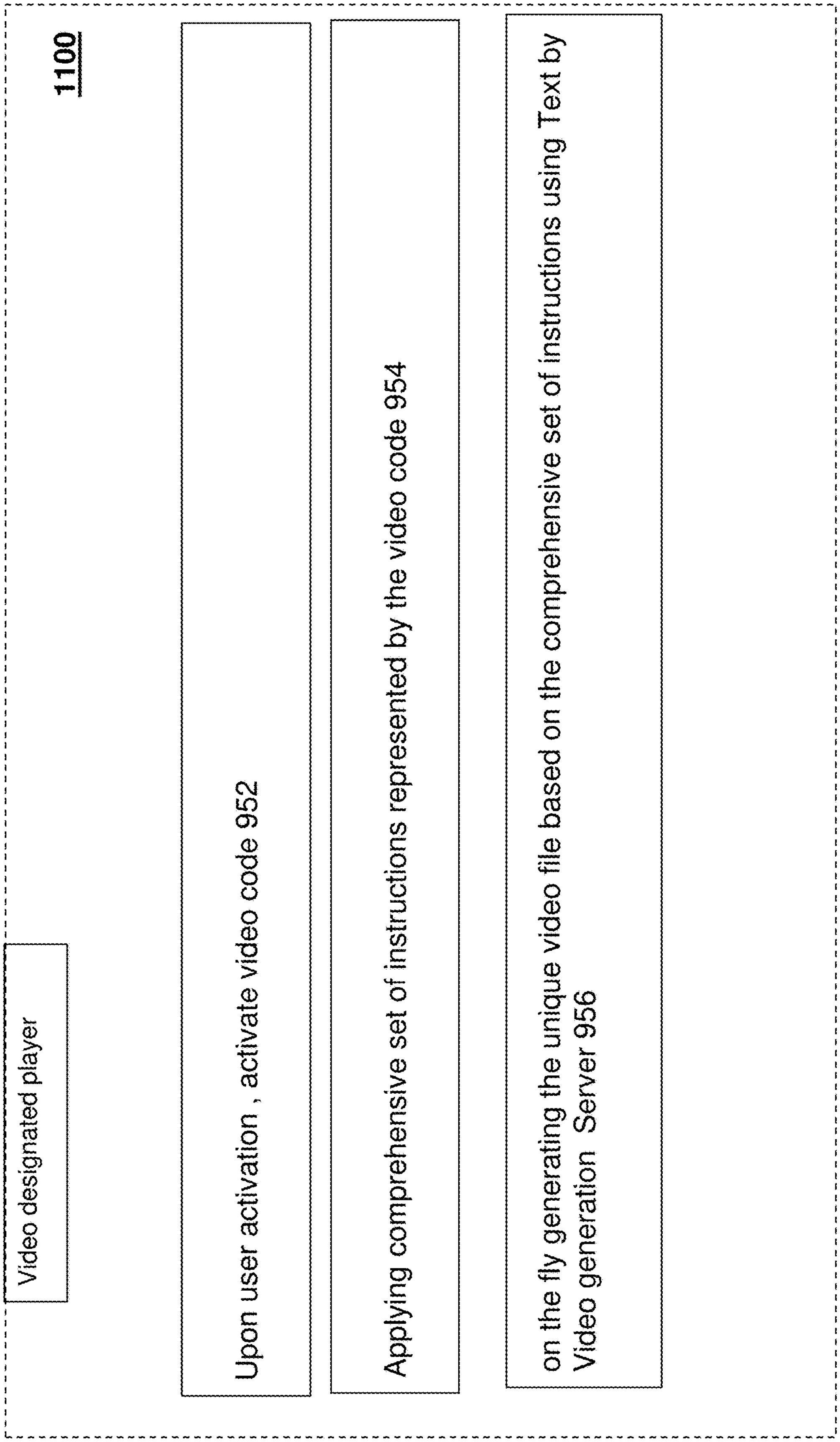

FIG. 9 presents a flowchart of the Video designated player, according to some embodiments of the invention.

DETAILED DESCRIPTION OF THE VARIOUS MODULES

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The following is a table of definitions of the terms used throughout this application, adjoined by their properties and examples.

Figure 1:
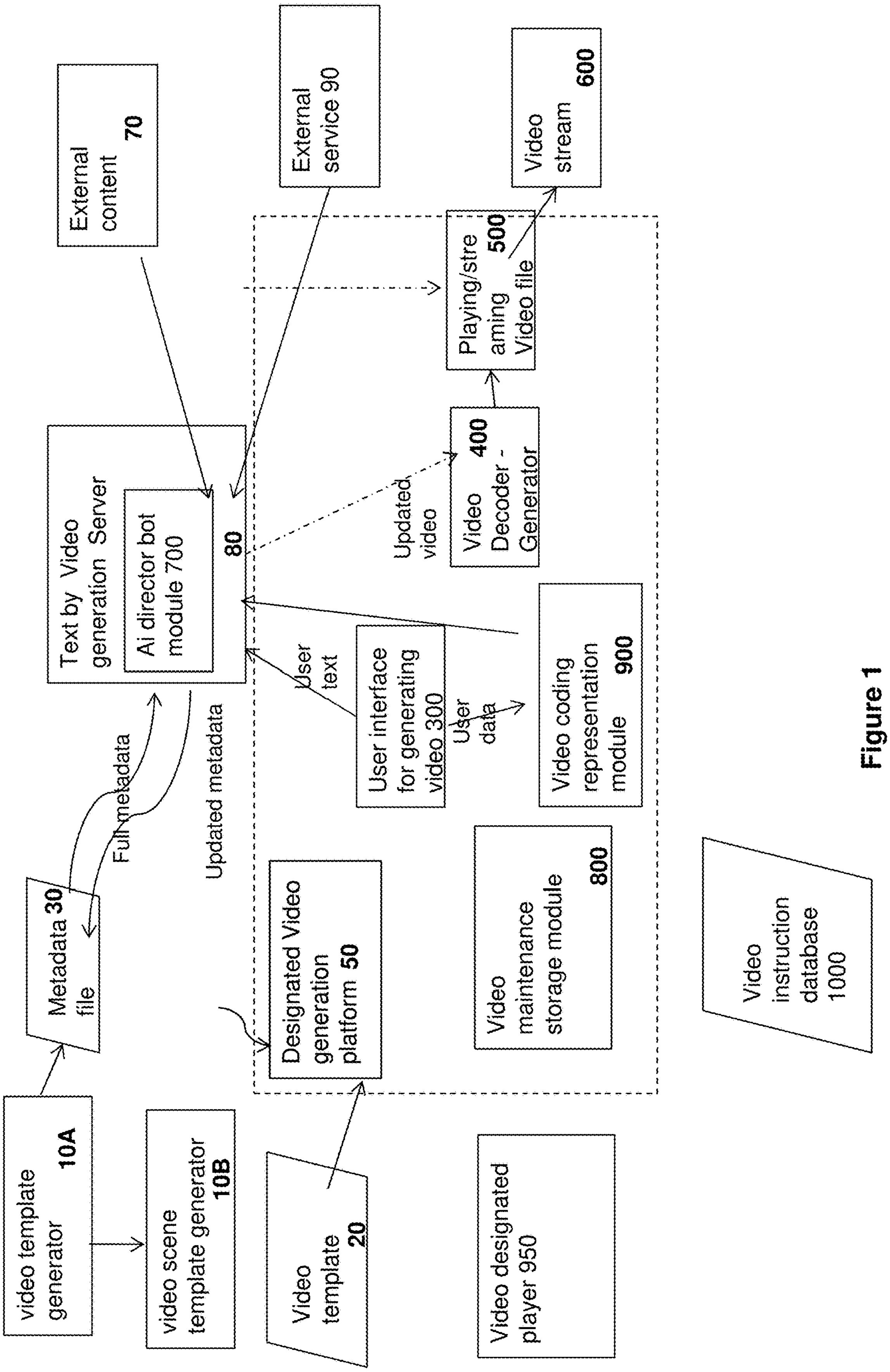
FIG. 1 is a block diagram, depicting the components and the environment of the video generation platform, according to some embodiments of the invention . . .

FIG. 1 is a block diagram illustrating the components and operational environment of the video generation platform 50, in accordance with certain embodiments of the invention.

The video generation platform 50 comprises the following key components:

1. User Interface (UI) 300-A user-facing interface designed to accept text or voice instructions input by the user and to facilitate selection between various video options generated by the platform.
2. Video Maintenance and Storage Module-A dedicated module responsible for storing generated videos and managing video data to ensure efficient retrieval and organization.
3. Text and Video Generation Server 80-A server configured to process user text, selections, and custom data inputs to generate corresponding video elements. The server utilizes either predefined video templates or an AI Director Module 700 to craft unique video outputs tailored to the user's specifications.
4. Video Decoder and Generator Module 600—This module is responsible for decoding and generating video files to be played or streamed.
5. AI Training Module 800-A component dedicated to training the AI model, allowing the platform to improve video customization accuracy over time.

The Video Database Management Module is designed to store each video file, including a complete set of instructions used for video creation and the original user text prompts (802).

Additionally:

The Video Coding Representation Module 900 generates a comprehensive set of instructions representing each unique video version, ensuring that video content is identifiable and reproducible.

The Video Designated Player 950 enables real-time generation of unique video files based on the comprehensive set of instructions, allowing for efficient on-the-fly video playback.

Figure 2:
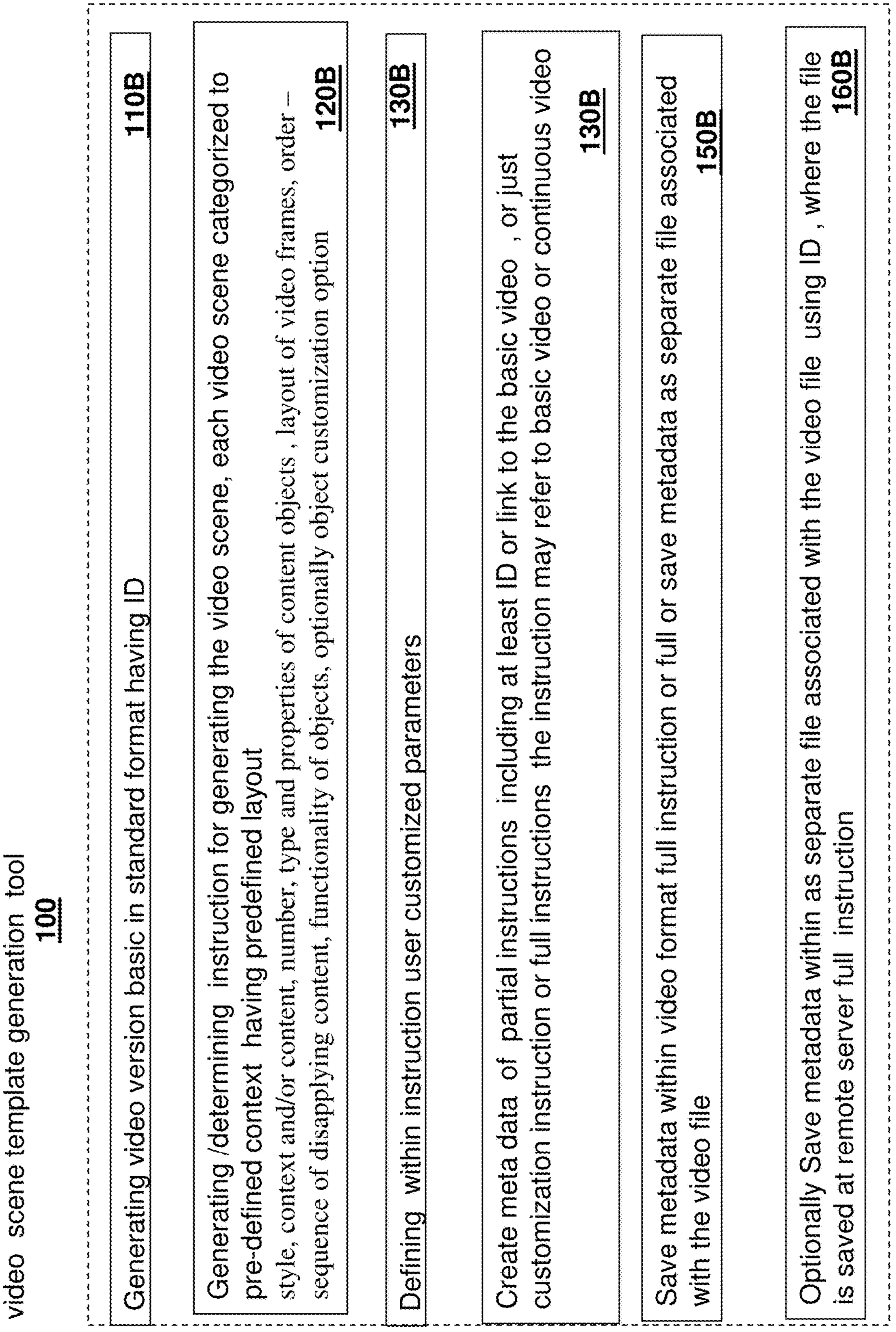
FIG. 2 is a flowchart depicting the video template generation module, according to some embodiments of the invention.

FIG. 2 is a flowchart depicting the video template generation module, according to some embodiments of the invention.

The video template generation module applies at least one of the followings steps Generating video version basic in standard format having ID, 110

Generating/determining instruction for generating the basic video and/or continuous video, each video categorized to pre-defined context having predefined layout.

style, emotion context and/or content, number, type and properties of content objects, layout of video frames, order-sequence of disapplying content, functionality of objects, optionally object customization option; 120

Defining within instruction scripts customized to defined scenarios related to the predefined context.

Defining within instruction user customized parameters 130;

Create meta data of partial instructions including at least ID or link to the basic video, or just customization instruction or full instructions the instruction may refer to basic video or continuous video 140;

Save metadata within video format full instruction or full or save metadata as separate file associated with the video file 150;

Optionally Save metadata within as separate file associated with the video file using ID, where the file is saved at remote server full instruction 160.

Figure 3:
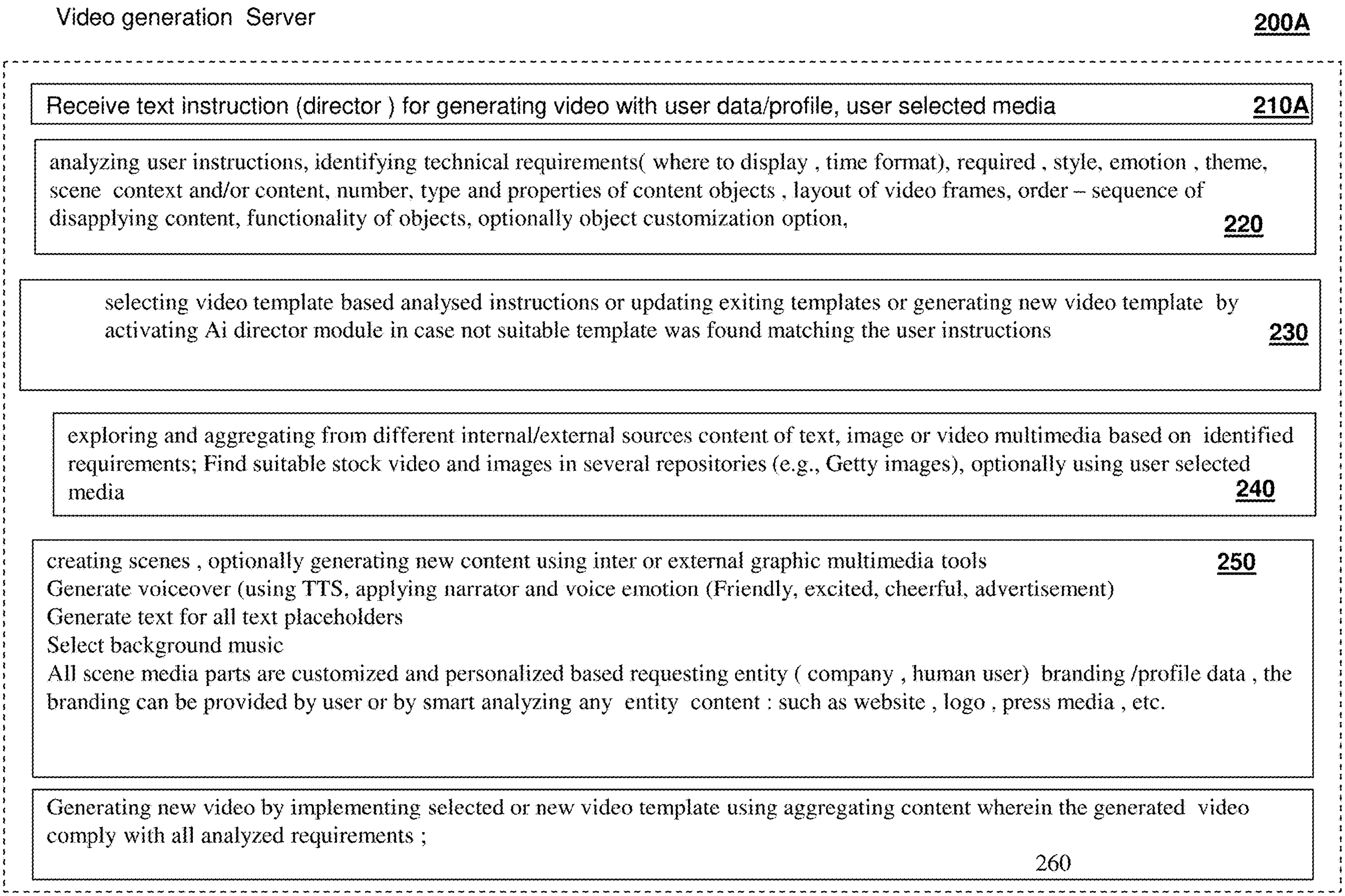
FIG. 3 is a flowchart depicting video generating by text server module according to some embodiments of the invention.

FIG. 3 is a flowchart depicting video generating by text server module according to some embodiments of the invention.

The text server module applies at least one of the following steps:

Receive text or voice instruction for generating video with user data/profile 210;

analyzing user instructions, identifying technical requirements (where to display, time format), required, style, emotion, theme, context and/or content, number, type and properties of content objects, layout of video frames, order-sequence of disapplying content, functionality of objects, optionally object customization option 220;

selecting video template based analyzed instructions or updating exiting templates or generating new video template 230;

exploring and aggregating from different internal/external sources content of text, image or video multimedia based on identified requirements 240;

creating scenes, optionally generating new content using inter or external graphic multimedia tools.

Generate voiceover (using TTS, applying narrator and voice emotion (Friendly, excited, cheerful, advertisement)

Generate text for all text placeholders.

Select background music.

All scene media parts are customized and personalized based requesting entity (company, human user) branding/ profile data, the branding can be provided by user or by smart analyzing any entity content: such as website, logo, press media, etc. 250.

Generating new video by implementing selected or new video template using aggregating content wherein the generated video complies with all analyzed requirements 260.

FIG. 4 illustrates a flowchart detailing the operations of the video user interface, as per some embodiments of the invention.

The user interface module executes a sequence of actions, including but not limited to the following steps:

User Input via Text or Voice (310): The user initiates interaction by entering instructions, either through text input or voice commands.

Instruction Transmission to Video Generation Server (320): The user's instructions are sent to the video generation server for processing.

Content Retrieval and Display (330): The system receives various elements, such as portions of the script, audio segments, and one or more generated video segments, which are then presented to the user for review.

Video Segment Selection (340): The user selects a preferred video segment from the options provided.

Further Customization and Editing (350): The user may add additional instructions or modify previous ones, with options to:

Manually select relevant media or generate new media using services like DALL-E-2.

Upload personal media or text content.

Delete scenes, update the script, or make other adjustments. After creating the video, providing correction instruction to the video, brief changes Approve the final version, with the option to continue manual editing as needed.

Final Selection (360): The user makes a final choice of at least one video segment to proceed with the completed video.

FIG. 5 presents a flowchart of the Ai video bot module, according to some embodiments of the invention.

The Ai video bot module apply at least one of the followings steps:

Receive user instruction, (text or voice data) 810;

Receiving generated video options 820;

Receiving user selections of video parts sequence, optionally, user editing actions such deleting scene, updating the script, User selected media 830;

Creating, training designated AI model configured to generate video, generating scripts, designing video layout, creating concept, creating selecting story board and style, defining scenario parts, by learning user preferences in relation to the user received instruction based on user text, selected video and user actions 840.

Creating, training designated AI model configured to generate video, by learning user preferences in relation to the user received instruction based on user text, selected video and user actions 840A;

Creating, training designated AI model configured to generating scripts by learning user preferences in relation to the user received instruction based on user text, selected video and user actions 840B;

Creating, training designated AI model configured to designing video layout, by learning user preferences in relation to the user received instruction based on user text, selected video and user actions 840C;

Creating, training designated AI model configured to, creating promotion/marketing concept/idea, by learning user preferences in relation to the user received instruction based on user text, selected video and user actions 840D;

Creating, training designated AI model configured to create/select story board, by learning user preferences in relation to the user received instruction based on user text, selected video and user actions 840E;

Creating, training designated AI model configured to define/determine video style, by learning user preferences in relation to the user received instruction based on user text, selected video and user actions 840F;

Creating, training designated AI model configured to select, determine generate content by learning user preferences in relation to the user received instruction based on user text, selected video and user actions 840F;

FIG. 6 presents a flowchart of the Ai director bot module, according to some embodiments of the invention.

The Ai director video bot module apply at least one of the followings steps:

Enabling user to select video type: promotion, education, informative, entrainment, social or personal 702A. alternatively Applying generative designated AI model for determining video type based on use instructions;

Applying generative designated AI model for generating promotion/marketing concept/idea/) or educational path, problem solution approach, based on user instruction 704B;

Generating personal designated AI model prompt based trained data for each specific type of video use case 706B;

Optionally, applying generative AI model for determining idea concept/general story board based on user instruction and/or generated promotion/marketing concept/idea;

Applying generative AI model for determining video style based on based on user instruction and/or determined style and or concept, wherein the style include emotion type, design format, length based on promotion concept, animation, sentence 708B;

Applying generative AI model selecting or generating content based on user instruction, generating promotion/marketing concept/idea determined concept, determined style 711A;

Applying generative AI model for creating text script based on the generated marketing concept, style and format for video using the text messages, wherein the script is comprised of scenes, each scene is designed to match layout structure of video scenes Wherein the video is comprised of scenes, each scene has motion layout format including definitions of type of objects motion, appearance order, layout of objects, order of displaying objects;

defining scenario parts/scene based on created determined script (user text), optionally selecting mini/sub template scene, optionally selecting from predefined scene (such coffee shop scene) 710A;

For each scenario part based on define script part determine layout style, context and/or content, emotion, theme number, type and properties of content objects, layout of video frames, order-sequence of disapplying content, functionality of objects, optionally object customization option, generating content using AI 712A.

Generating video based on the defined scenario parts, selected or generated content and determined layout style, 714A.

FIG. 6B presents a flowchart of the Ai director bot module, according to some embodiments of the invention.

The Ai director video bot module apply at least one of the followings steps:

Selecting video type: promotion, education, informative, entrainment, social or personal 702B;

Optionally changing/generating script based on selected classes, like directing instruction form the classes or customized Classes of brands, classes including instructions;

Applying generative designated AI model for generating promotion/marketing concept/idea/) or educational path, problem solution approach, based on user instruction and determined classes 704B;

Applying generative AI model for determining classes based on user instruction and/or the generated marketing concept, and/or style 706B;

This process encompasses several sophisticated steps:

Classes Selection: AI selects relevant classes for a given task, whether to promote a product, support a script, or integrate into a template.

Combining between classes making adaption, select classes for each part of the script;

Check style of each classes make adaption of styles, packed of compatible classes, format pf classes technical properties 1. Intelligent Class Selection:

AI-driven selection of relevant classes for the given task

Tasks may include product promotion, script support, or template integration

Classes are chosen based on their relevance, effectiveness, and compatibility with the project goals, user instructions and video type 2. Class Combination and Adaptation:

Strategic selection of classes for each script segment

Style analysis and adaptation for cohesive integration

Grouping of compatible classes to ensure harmonious execution

Adjustment of class formats and technical properties for optimal performance

Optionally, applying generative AI model for determining idea concept/general story board based on based on user instruction and/or generated promotion/marketing concept/idea and/or and determined classes;

Optionally, Applying generative AI model for determining video style based on based on and determined classes and/or user instruction and/or determined style and or concept, wherein the style include emotion type, design format, length based on promotion concept, animation, sentence 708B;

Applying generative AI model for creating text script first based on adapting script to the determined classes and only optionally based on the generated marketing concept, style and format for video using the text messages, wherein the script is comprised of scenes, each scene is designed to match layout structure of video scenes 708;

Wherein the video is comprised of scenes, each scene has motion layout format including definitions of type of objects appearing, layout of objects, order of displaying objects;

Wherein the video is comprised of scenes, each scene has motion layout format including definitions of type of objects motion, appearance order, layout of objects, order of displaying objects;

defining scenario parts/scene based on created determined script (user text), optionally selecting mini/sub template scene, optionally selecting from predefined scene (such coffee shop scene) 710B;

Applying generative AI model selecting or generating content based on user instruction, generating promotion/marketing concept/idea determined concept, determined style 711B;

For each scenario part based on define script part determine layout style, context and/or content, emotion, theme number, type and properties of content objects, layout of video frames, order-sequence of disapplying content, functionality of objects, optionally object customization option, generating content using AI 712B.

Generating video based on the defined scenario parts, selected or generated content and determined classes, 714B.

FIG. 7 presents a flowchart of the Video database management module, according to some embodiments of the invention.

The Video database management module apply at least one of the followings steps:

Storing each video file comprehensive set of instructions used to create the video and user original text prompt 802;

Classifying video instruction by context and/or user original text 804;

Receiving User text request for new video 806.

Search video instruction database for best match to instruction and/or user text 808;

Editing best match 81;

FIG. 7: Flowchart of the Video Database Management Module

In this section, we present a flowchart depicting the functionalities of the Video Database Management Module, as per several embodiments of the invention.

The Video Database Management Module performs a series of essential steps, including but not limited to:

1. Storing Comprehensive Video Instructions

This step involves the storage of a comprehensive set of instructions utilized in the creation of each video, along with the original text prompts provided by the user (referred to as "user original text prompt" hereafter). This combination of data, encompassing both the technical instructions and the user's creative input;

2. Video Instruction Classification

The Video Database Management Module is also responsible for classifying video instructions based on contextual factors and/or the user's original text. This classification helps organize and categorize the instructions for efficient retrieval and usage.

3. User Text Request Processing

This step involves receiving text requests from users who are seeking to create new videos. These user-initiated text requests, referred to as "User text request for new video" are an essential input for generating customized videos.

4. Searching the Video Instruction Database

The module's next task is to search the video instruction database to find the best matching instructions based on the user's request and the existing instructions. This search operation, ensures that the video creation process is guided by the most relevant and suitable instructions.

5. Editing the Best Match

Finally, upon locating the best match between the user's request and the available video instructions, the Video Database Management Module proceeds to edit the selected instructions to further optimize the match. This editing process, labeled as "best match", ensures that the final video output aligns with the user's expectations and creative intent.

In summary, the Video Database Management Module encompasses a series of steps, from storing comprehensive video instructions to processing user text requests, searching for the best-matching instructions, and fine-tuning the chosen instructions to produce high-quality, user-specific video content. This system facilitates a seamless and efficient video creation process, enhancing the overall user experience.

FIG. 8 presents a flowchart of the Video coding representation module, according to some embodiments of the invention.

The Video coding representation module applies at least one of the followings steps;

Determining comprehensive set of instructions which represent unique video version 902;

Saving said comprehensive set of instructions as video code, instruction for assets of the video: text, image, audio video, link to media object (public media links) 904;

Creating video file which upon activation, use this code for playing the unique video version 906;

Receiving User text request for new video 908;

Search video files database for video having code representing instruction similar to user text 910;

FIG. 8: Flowchart of the Video Coding Representation Module

In this section, we present a flowchart illustrating the functionalities of the Video Coding Representation Module, in accordance with various embodiments of the invention.

The Video Coding Representation Module is responsible for executing one or more of the following critical steps:

Determining Comprehensive Set of Instructions for Unique Video Version

This step involves the identification and determination of a comprehensive set of instructions that represent a unique version of a video (referred to as "video version" hereafter). "These instructions," serve as the blueprint for creating distinct video content.

Saving Comprehensive Instructions as Video Code

Upon determining the comprehensive set of instructions, the module proceeds to save these instructions as video code. This video code encompasses instructions for all elements of the video, including text, images, audio, video clips, and links to external media objects (such as public media links). This comprehensive data is labeled as "904" and serves as the basis for video creation.

Creating Video File with Activation Code

The Video Coding Representation Module is also responsible for generating a video file that, upon activation, utilizes the stored video code to play the unique video version. This creation of the video file, ensures that the video content aligns precisely with the defined instructions, resulting in a tailored video experience.

4. Receiving User Text Request for New Video

In this step, the module receives text requests from users who are seeking to create new videos. These user-generated text requests, denoted as "User text request for new video" (labeled "908"), are essential inputs for customizing video content to meet user preferences.

5. Searching Video Files Database for Matching Instructions

Subsequently, the Video Coding Representation Module searches the video files database for videos that possess codes representing instructions similar to the user's text request. This search process, identified as "910," ensures that the module can quickly locate and provide relevant video content that aligns with the user's request.

In summary, the Video Coding Representation Module plays a pivotal role in the video creation process. It begins by determining unique video instructions, saving them as video code, and using this code to generate tailored video files upon activation. Additionally, the module facilitates the user experience by receiving text requests and efficiently retrieving video content that matches the user's expressed preferences, ultimately enhancing the overall effectiveness and personalization of video creation.

FIG. 9 presents a flowchart of the Video designated player, according to some embodiments of the invention.

The Video designated player apply at least one of the followings steps Upon user activation, activate video code 952;

Applying comprehensive set of instructions represented by the video code 954 on the fly generating the unique video file based on the comprehensive set of instructions using Text by Video generation Server 956

FIG. 9: Flowchart of the Video Designated Player

In this section, we introduce a flowchart that illustrates the operations of the Video Designated Player, in accordance with various embodiments of the invention.

The Video Designated Player is designed to execute at least one of the following crucial steps:

1. Activation of Video Code Upon User Activation

Upon user activation of the Video Designated Player, the player initiates the activation of a specific video code. This video code serves as the key to unlocking and playing the designated video content. (step 952)

2. Applying Comprehensive Instructions Represented by Video Code

Subsequently, the Video Designated Player applies a comprehensive set of instructions represented by the activated video code. These instructions, provide detailed guidance on how the video content should be presented and rendered to the user. (step 9540).

3. On-the-Fly Generation of Unique Video File

One of the primary functions of the Video Designated Player is to dynamically generate a unique video file in real-time based on the comprehensive set of instructions. This process involves the use of a Text-to-Video Generation Server (labeled as "Text by Video Generation Server to transform textual instructions into visual and auditory elements, ultimately creating a customized video tailored to the user's specifications. (step 956)

In summary, the Video Designated Player serves as the bridge between user interaction and video content delivery. It activates video codes upon user initiation, applies comprehensive instructions embedded in the codes, and collaborates with a Text-to-Video Generation Server to produce unique video files on-the-fly. This dynamic and user-centric approach ensures that the video experience is highly customizable and responsive to user preferences, enhancing the overall effectiveness and personalization of video playback.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purposes only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting of" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional elements.

It is to be understood that where the claims or specification refer to "a" or "an" element, such reference is not construed that there is only one of that elements.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A method for generating a video, implemented by one or more processors operatively coupled to a non-transitory computer readable storage device, on which are stored modules of instruction code that when executed cause the one or more processors to perform said method comprising the steps of:

receiving user instruction describing the requested video;

applying generative AI model for generating promotion/marketing concept based on user instruction;

applying generative AI model for determining video style based on user instruction and/or generated promotion/marketing concept, wherein the style include at least one of: emotion type, design format;

applying generative AI model for creating text script based on the generated marketing concept and/or user instructions and/or style, wherein the script is comprised of scenes, each scene is designed to match layout structure of video scenes;

applying generative AI model for creating video layout for each scenario part based on define script part and/or user instruction, wherein each layout structure of video scene is designed to match promotional concept or video style;

wherein the video is comprised of scenes, each scene has layout format including definitions of type of objects motion or appearing, layout of objects and order of displaying objects;

generating video based on created text script, determined video layout and style.

2. The method of claim 1 wherein promotion/marketing concept include at least one of educational, informative or entrainment.

3. The method of claim 1 wherein video style is limited by personal style or design limitation brand guidance.

4. The method of claim 1 further comprising the step of applying generative AI model for determining idea concept for a story board, wherein the generation of the script is further based on the story board.

5. The method of claim 1 wherein defining scenario parts/scene is based on created determined script.

6. The method of claim 1 wherein Ai video model is generated by applying the followings steps: receive user instruction, receiving generated video options, receiving user selections of video parts sequence, user editing actions, and training AI model for learning user preferences in relation to the user text of based on user text, selected video and user editing actions.

7. The method of claim 1 wherein the user interface is configured to apply one of the following actions: receive user instruction, editing previous instruction, selecting manually more relevant media or use services to generate media, uploading media or text User, deleting scenes, update the script.

8. The method of claim 1 further comprising the step of creating, training designated AI model configured to, creating promotion/marketing concept/idea, by learning user preferences in relation to the user received instruction based on user text, selected video and user actions.

9. The method of claim 1 further comprising the step of creating, training designated AI model configured to generate video, by learning user preferences in relation to the user received instruction based on user text, selected video and user actions.

10. The method of claim 1 further comprising the step of creating, training designated AI model configured to generating scripts by learning user preferences in relation to the user received instruction based on user text, selected video and user actions.

11. The method of claim 1 further comprising the step of designing video layout, creating concept, by learning user preferences in relation to the user received instruction based on user text, selected video and user actions.

12. The method of claim 1 further comprising the step of creating, training designated AI model configured to designing video layout, by learning user preferences in relation to the user received instruction based on user text, selected video and user actions.

13. The method of claim 1 further comprising the step of creating, training designated AI model configured to generating scripts by learning user preferences in relation to the user received instruction based on user text, selected video and user actions.

14. The method of claim 1 further comprising the step of creating, training designated AI model configured to, creating promotion/marketing concept/idea, by learning user preferences in relation to the user received instruction based on user text, selected video and user actions.

15. The method of claim 1 further comprising the step of creating, training designated AI model configured to define/determine video style, by learning user preferences in relation to the user received instruction based on user text, selected video and user actions.

16. The method of claim 1 further comprising the step of creating, training designated AI model configured to select, determine generate content by learning user preferences in relation to the user received instruction based on user text, selected video and user actions.

17. A system for generating a video, implemented by one or more processors operatively coupled to a non-transitory computer readable storage device, on which are stored modules processors to perform the steps of:

user interfaces module configured to receive user instruction describing the requested video;

video generation server configured for:

applying generative AI model for generating promotion/marketing concept based on user instruction;

applying generative AI model for determining video style based on user instruction and/or generated promotion/marketing concept, wherein the style include at least one of: emotion type, design format;

applying generative AI model for creating text script based on the generated marketing concept and/or user instructions and/or style, wherein the script is comprised of scenes, each scene is designed to match layout structure of video scenes;

applying generative AI model for creating video layout for each scenario part based on define script part and/or user instruction, wherein each layout structure of video scene is designed to match promotional concept or video style;

wherein the video is comprised of scenes, each scene has layout format including definitions of type of objects motion or appearing, layout of objects and order of displaying objects generating video based on created text script, determined video layout and style.

18. The system of claim 17 wherein Ai video model is generated by applying the followings steps: receive user instruction, receiving generated video options, receiving user selections of video parts sequence, user editing actions, and training AI model for learning user preferences in relation to the user text of based on user text, selected video and user editing actions.

19. The system of claim 17 wherein the video generation server is further configured to creating, training designated AI model configured to, creating promotion/marketing concept/idea, by learning user preferences in relation to the user received instruction based on user text, selected video and user actions.

20. The system of claim 17 wherein the video generation server is further configured to creating, training designated AI model configured to generate video, by learning user preferences in relation to the user received instruction based on user text, selected video and user actions.

21. The system of claim 17 wherein the video generation server is further configured to creating, training designated AI model configured to generating scripts by learning user preferences in relation to the user received instruction based on user text, selected video and user actions.

* * * * *